US011764705B2

(12) United States Patent
Yang et al.

(10) Patent No.: US 11,764,705 B2
(45) Date of Patent: Sep. 19, 2023

(54) HIGH-TORQUE AND HIGH-PRECISION ULTRASONIC MOTOR WITH SELF-PROTECTION FUNCTION AND IMPLEMENTATION MODE THEREOF

(71) Applicants: NUAA Super Control Technology Co., Ltd., Nanjing (CN); Nanjing University of Aeronautics and Astronautics, Nanjing (CN)

(72) Inventors: Lin Yang, Nanjing (CN); Mojian Yang, Nanjing (CN); Chunsheng Zhao, Nanjing (CN)

(73) Assignees: NUAA Super Control Technology Co., Ltd., Nanjing (CN); Nanjing University of Aeronautics and Astronautics, Nanjing (CN)

( * ) Notice: Subject to any disclaimer, the term of this patent is extended or adjusted under 35 U.S.C. 154(b) by 0 days.

(21) Appl. No.: 17/863,907

(22) Filed: Jul. 13, 2022

(65) Prior Publication Data
US 2023/0115036 A1  Apr. 13, 2023

(30) Foreign Application Priority Data

Oct. 12, 2021 (CN) .......................... 202111195059.7

(51) Int. Cl.
*H02N 2/12* (2006.01)
*H02N 2/00* (2006.01)
(Continued)

(52) U.S. Cl.
CPC ............. *H02N 2/12* (2013.01); *H02N 2/0065* (2013.01); *H02N 2/142* (2013.01); *H02N 2/163* (2013.01)

(58) Field of Classification Search
CPC ........ H02N 2/12; H02N 2/0065; H02N 2/142; H02N 2/163; H02N 2/10; H02N 2/123; H02N 2/14; H02K 11/21
See application file for complete search history.

(56) References Cited

U.S. PATENT DOCUMENTS

| 4,937,488 A | 6/1990 | Fujie et al. |
| 5,811,901 A | 9/1998 | Nagai et al. |

FOREIGN PATENT DOCUMENTS

| CN | 101702592 A | 5/2010 |
| CN | 102437677 A | 5/2012 |

(Continued)

*Primary Examiner* — Emily P Pham
(74) *Attorney, Agent, or Firm* — Laurence A. Greenberg; Werner H. Stemer; Ralph E. Locher (57) ABSTRACT

A high-torque and high-precision ultrasonic motor with a self-protection function and an implementation mode of the high-torque and high-precision ultrasonic motor are provided. In the device, a gasket encloses an output shaft of an ultrasonic motor body. A harmonic reducer encloses a shell of the ultrasonic motor body. A motor shaft penetrates through the ultrasonic motor body. The end, close to the motor shaft, of the ultrasonic motor body is defined as a top end, and the bottom end of the motor shaft is sequentially enclosed with an encoder support and a high-precision encoder assembly. The gasket, the harmonic reducer, the encoder support and the high-precision encoder assembly are sequentially arranged from the ultrasonic motor body to the bottom end of the motor shaft. After the ultrasonic motor body decelerates and increases torque, the motor shaft outputs rotating speed and torque.

20 Claims, 5 Drawing Sheets

(51) Int. Cl.
*H02N 2/14* (2006.01)
*H02N 2/16* (2006.01)

(56) References Cited

FOREIGN PATENT DOCUMENTS

| | | | |
|---|---|---|---|
| CN | 105048866 | A | 11/2015 |
| CN | 206026800 | U | 3/2017 |
| CN | 208369491 | U | 1/2019 |
| DE | 19512080 | A1 | 10/1995 |
| JP | 07170767 | A * | 7/1995 |

* cited by examiner

HIGH-TORQUE AND HIGH-PRECISION ULTRASONIC MOTOR WITH SELF-PROTECTION FUNCTION AND IMPLEMENTATION MODE THEREOF

CROSS REFERENCE TO RELATED APPLICATION

This patent application claims the benefit and priority of Chinese Patent Application No. 202111195059.7, filed on Oct. 12, 2021, the disclosure of which is incorporated by reference herein in its entirety as part of the present application.

TECHNICAL FIELD

The present disclosure relates to a high-torque and high-precision ultrasonic motor with a self-protection function and an implementation mode thereof, and belongs to the technical field of ultrasonic motors.

BACKGROUND ART

The traveling wave ultrasonic motor originates from Japan at the earliest and is a novel small and special motor. The working principle of the traveling wave ultrasonic motor is different from the working principle of a traditional electromagnetic motor in that micro-amplitude vibration of an elastomer stator in an ultrasonic frequency domain is excited by utilizing the inverse piezoelectric effect of a piezoelectric ceramic piece, and the micro-amplitude vibration is converted into macroscopic rotation motion of the rotor through the friction effect between the stator and the rotor, so as to output a power and drive the load. The novel small and special motor usually has a small power and a load capacity which is sharply reduced at low speed, due to the limitation of the output rotating speed and the output torque caused by natural modes of the stator and the piezoelectric ceramic piece limiting the amplitude and the frequency both. Along with the progress and development of rotary traveling wave ultrasonic motors, ultrasonic motors with large output torque and large output power also appear, but are generally formed by coaxially connecting a plurality of ultrasonic motors (or stator and rotor assemblies) in series. For example, for a serial ultrasonic motor, which is formed by connecting double stators and double rotors in series, provided in the utility model U.S. Pat. No. 4,937,488A and a novel disc-shaped traveling wave ultrasonic motor, which is of stepped shaft structure and has double stators and double rotors, provided in the utility model patent CN101702592A, the maximum output power of such serial rotary traveling wave ultrasonic motor is less than 15 W. In addition, a serial ultrasonic motor disclosed in the Chinese patent No. CN208369491U by our company in 2018, is a rotary traveling wave ultrasonic motor capable of being coaxially connected in series with n stator and rotor assemblies. At present, actual products with model numbers CSX76S3-60-B-C2 and CSX76S3-60-B-C4 converted from the above patents have maximum output powers of only 20 W and 40 W respectively, and the maximum output torque of 2.4 N·m and 5 N·m respectively, wherein the axial dimensions of the body of the CSX76S3-60-B-C4 type ultrasonic motor reach 70 mm, and the space envelope size becomes larger. For certain applications such as mechanical arm joint acting, solar wing/antenna sailboard unfolding, it is required that the motor has small dimension, large output torque, usually up to tens of Nm, and lower output rotating speed, generally less than 1°/s; and has a positioning precision up to the angle second level. Obviously, the rotary traveling wave ultrasonic motor in the prior art cannot completely meet the requirements and has an appli01cation bottleneck.

According to general technical conditions of a GB/T 38337-2019 ultrasonic motor and a driving controller thereof, duty zones of the ultrasonic motor can be divided into a long-time duty zone, a short-time duty zone and a non-duty area. In the long-time duty zone, the ultrasonic motor operates under an S3 working system (less than or equal to 50%) in the service life of the ultrasonic motor, and can be continuously operated and used. In the short-time duty zone, in the service life of the ultrasonic motor, the ultrasonic motor operates under an S3 working system (less than or equal to 40%) and can be intermittently operated and used. The non-duty zone can be divided into two zones according to working conditions, one zone is where the output rotating speed is lower than an allowable minimum working rotating speed and the output torque falls within an allowable maximum working torque; and the other zone is where the output rotating torque falls between the allowable maximum working torque and the maximum torque (locked-rotor torque) and the output rotating speed is arbitrary. The non-duty zone is not allowed to be used in the service life of the ultrasonic motor. In the non-duty zone, especially an zone where the output torque falls between the allowable maximum working torque and the maximum torque (locked-rotor torque) and the output rotating speed is arbitrary, when the maximum torque (namely locked-rotor torque with the rotating speed of zero) is used, the contact surface between the stator and the rotor of the ultrasonic motor is seriously damaged, so that the output performance of the ultrasonic motor is sharply reduced, specifically the output rotating speed, the load capacity and the output stability of the ultrasonic motor operating in a rated power supply state are reduced.

In the prior art, the output rotating speed of the ultrasonic motor is limited by limiting the working frequency range of the ultrasonic motor, or the temperature drift frequency of the ultrasonic motor is automatically compensated by detecting the temperature of the stator in the ultrasonic motor through a thermistor, so as to prevent the ultrasonic motor from operating at a resonant frequency, which may cause the motor to be damaged. The ultrasonic motor is free of a self-protection function. During use, the motor is operated to not exceed the allowable maximum working torque only through controlling the load manually, and hence in case of human errors, such as when the loaded load exceeding the allowable maximum working torque, and a sudden jamming of the system at the output end due to certain faults, the ultrasonic motor can be locked, and the friction contact surface between the stator and the rotor of the ultrasonic motor is damaged.

Therefore, it is desired to develop an ultrasonic motor with a self-protection function, ultra-low speed, ultra-large torque, as well as higher and more stable output angle resolution.

SUMMARY

The present disclosure provides a high-torque and high-precision ultrasonic motor with a self-protection function and an implementation mode thereof, which is larger in motor output torque, lower in output rotating speed, and higher and more stable in output angle resolution, and has a self-protection function. Further, the ultrasonic motor according to the present disclosure allows not only the friction contact surface between the stator and the rotor to be prevented from being damaged, and but also the harmonic reducer to be prevented from being damaged.

The technical scheme adopted for solving the technical problem of the present disclosure is as follows.

A high-torque and high-precision ultrasonic motor with a self-protection function comprises an ultrasonic motor body, a gasket, a harmonic reducer, a motor shaft, an encoder support and a high-precision encoder assembly, wherein:

the gasket is sleeved on an output shaft of the ultrasonic motor body, the harmonic reducer is sleeved to a shell of the ultrasonic motor body, the motor shaft penetrates through the ultrasonic motor body, the end, close to the motor shaft, of the ultrasonic motor body is defined as a top end, and the bottom end of the motor shaft is sequentially sleeved with the encoder support and the high-precision encoder assembly; and the gasket, the harmonic reducer, the encoder support and the high-precision encoder assembly are sequentially arranged from the ultrasonic motor body to the bottom end of the motor shaft.

As further improvement of the present disclosure, the ultrasonic motor body comprises a stator seat, a bearing end cover, a second bearing, a stator assembly, a stator gland, a first bearing, a flexible rotor assembly, a rotor shaft, a pre-pressure adjusting gasket, an auxiliary adjusting gasket, an input friction disc, an output friction disc assembly, an output shaft, a pre-pressure adjusting nut, a shell and a third bearing, a threaded hole coaxial with the motor shaft is formed in the center of the shell close to the bottom end of the motor shaft, and a third bearing is embedded in the pre-pressure adjusting nut and is inserted into the threaded hole formed in the center of the shell;

the output shaft is coaxially and fixedly connected with the output friction disc assembly, and the output shaft and the motor shaft coaxially penetrate through the third bearing embedded in the pre-pressure adjusting nut;

a bearing hole coaxial with the motor shaft is formed in the center of the stator seat, the depth of the bearing hole is ½-⅘ of the thickness of the first bearing, the first bearing is embedded in the bearing hole formed in the center of the stator seat, and the rotor shaft and the motor shaft coaxially penetrate through the stator seat and the first bearing; and the stator assembly is further arranged on the surface of the stator seat, the upper surface of an inner ring of the stator assembly is covered with the stator gland, and the flexible rotor assembly and the input friction disc are sequentially arranged on the surface of the stator assembly and sleeve the rotor shaft.

The stator assembly comprises a flexible printed board, a piezoelectric ceramic piece and a stator, and the flexible printed board, the piezoelectric ceramic piece and the stator are coaxially and sequentially sleeved on a convex cylinder arranged in the stator seat from the top end of the motor shaft to the bottom end of the motor shaft; and the flexible rotor assembly comprises a friction material, a rotor and damping rubber, and the friction material, the rotor and the damping rubber are coaxially and sequentially stacked in the direction from the top end of the motor shaft to the bottom end of the motor shaft.

As further improvement of the present disclosure, the rotor shaft penetrates through the first bearing and is of a hollow structure, the pre-pressure adjusting gasket is arranged between the first bearing and the rotor shaft, and the auxiliary adjusting gasket is arranged between the first bearing and the flexible rotor assembly.

As further improvement of the present disclosure, the bearing gland is arranged at the spigot end, close to the top end of the motor shaft, of the stator seat, and the second bearing is coaxially arranged on the inner side of the bearing gland;

the input friction disc is arranged on the surface of an inner web plate of the rotor and is fixedly connected with the rotor shaft; and the output friction disc assembly is stacked on the surface of the input friction disc and comprises an output friction disc and a friction plate, and an inner web plate of the output friction disc is fixedly arranged on the output shaft penetrating through the third bearing.

As further improvement of the present disclosure, the ultrasonic motor set body comprises two friction pairs, the tooth surface of the stator assembly and the friction material surface of the flexible rotor assembly form the first friction pair which is an ultrasonic motor driven friction pair, and the outer ring surface of the input friction disc and the surface of the friction plate of the output friction disc assembly form the second friction pair which is a torque protection device friction pair; and the torque protection device friction pair is a torque limiting protection device of the ultrasonic motor body.

As further improvement of the present disclosure, the harmonic reducer comprises a wave generator, a flexible gear, a steel wheel, a special-shaped bearing and a sealing ring, the wave generator is coaxially sleeved on the output shaft with the central axis of the motor shaft as the central line, and the gasket is arranged between the output shaft and the wave generator.

one end face of the steel wheel is coaxially and fixedly installed on the end face of a special-shaped bearing inner ring, and the other end face of the steel wheel is fixedly connected with a flange plate of the motor shaft;

the flexible gear is coaxially and fixedly installed on the end face of a special-shaped bearing outer ring, and meanwhile the special-shaped bearing outer ring and the flexible gear are coaxially and fixedly installed on the shell; and the sealing ring is embedded between the special-shaped bearing outer ring and the steel wheel.

As further improvement of the present disclosure, the high-precision encoder assembly comprises an encoder coded disc and an encoder shell;

the encoder coded disc is fixedly arranged at the position, close to the bottom end, of the motor shaft in a sleeving mode, and the coded disc is covered with the encoder shell, wherein the encoder support is coaxially installed on the special-shaped bearing outer ring, and the encoder shell and the encoder support are fixed; and the encoder shell also comprises an encoder reading head.

According to an implementation mode of the high-torque and high-precision ultrasonic motor with a self-protection function, the output shaft of the ultrasonic motor body outputs rotating speed and torque to the wave generator of the harmonic reducer, the rotating speed and torque are output through the motor shaft, and the high-precision encoder assembly feeds back the output rotating speed and angle position information of the motor shaft.

As further improvement of the present disclosure, a maximum torque output by the ultrasonic motor driven friction pair is denoted by $T_3$, a maximum working torque output by the ultrasonic motor driven friction pair is denoted by $T_1$, a static friction torque of the torque protection device friction pair is denoted by $T_2$, a maximum torque instantaneously allowed by the harmonic reducer is denoted by $T_4$, and the output reduction ratio of the harmonic reducer is denoted by i, $T_1$ is 70%-85% of $T_3$, namely $T_1$ is equal to (70%-85%)·$T_3$, the static friction torque $T_2$ is smaller than or equal to the maximum working torque $T_1$, and the static friction torque $T_2$ is smaller than or equal to $T_4$/i, and the upper limit value of the static friction torque $T_2$ is a smaller value of $T_1$ and $T_4$/i;

when $T_1$ is smaller than or equal to $T_4$/i, namely $T_2$ is equal to $T_1$, in a case that the load applied to the output end of the motor is larger than or equal to i·$T_2$, after the torque transmitted back to the torque protection device friction pair reaches the static friction torque limit value $T_1$, the torque protection device friction pair slips, and at the moment, the actual torque borne by the harmonic reducer is i·$T_1$, the actual torque transmitted back to the ultrasonic motor driven friction pair is $T_1$, $T_1$ is equal to $T_2$ and smaller than $T_3$, and i·$T_1$ is smaller than or equal to $T_4$, so that the friction contact surface between the stator of the ultrasonic motor body and the rotor of the ultrasonic motor body is not damaged, and the harmonic reducer is not damaged; and when $T_1$ is greater than $T_4$/i, namely $T_2$ is equal to $T_1$, in a case that the load applied to the output end of the motor is larger than or equal to $T_4$, after the torque transmitted back to the torque protection device friction pair reaches the static friction torque limit value $T_4$/i, the torque protection device friction pair slips, and at the moment, the actual torque borne by the harmonic reducer is $T_4$, meanwhile, the actual torque transmitted back to the ultrasonic motor driven friction pair is $T_4$/i, $T_4$/i is equal to $T_2$ and smaller than $T_1$, and $T_1$ is smaller than $T_3$, so that the friction contact surface between the stator of the ultrasonic motor body and the rotor of the ultrasonic motor body is not damaged, and the harmonic reducer is not damaged.

Through the technical scheme, compared with the prior art, the present disclosure has the following beneficial effects.

Firstly, according to the ultrasonic motor provided by the present disclosure, the ultrasonic motor, the harmonic reducer and the high-precision encoder are integrated into a whole to form a brand-new ultrasonic motor, and the advantages of extremely low speed and high resolution of the ultrasonic motor and the advantages of stable transmission, high motion precision and large transmission ratio of the harmonic reducer are combined, so that the final output rotating speed of the ultrasonic motor is further greatly reduced, the final output torque of the ultrasonic motor is greatly improved, and the final output angular resolution and the positioning precision of the ultrasonic motor are greatly improved.

Secondly, the ultrasonic motor provided by the present disclosure adopts the harmonic reducer with a large reduction ratio, so that the lowest working rotating speed of the ultrasonic motor is greatly reduced, and the stability of the ultrasonic motor at a low rotating speed is improved.

Thirdly, the ultrasonic motor provided by the present disclosure is provided with a torque limiting protection device, so that the ultrasonic motor can be prevented from damaging the friction contact surface between the stator and the rotor when the ultrasonic motor is in a locked-rotor state, and the flexible gear of the harmonic reducer, teeth on the flexible gear and teeth on the steel wheel can be prevented from being damaged.

BRIEF DESCRIPTION OF THE DRAWINGS

The description of the present disclosure is further described in conjunction with the attached figures and embodiments.

Reference signs: in FIG. 1 to FIG. 4, 1, ultrasonic motor body with self-protection function; 101, stator seat; 102, stator assembly; 1021, stator; 1022, piezoelectric ceramic piece; 1023, flexible printed board; 103, stator gland; 104, flexible rotor assembly; 1041, rotor; 1042, friction material; 1043, damping rubber; 105, motor lead cable; 106, wire pressing buckle; 107, rotor shaft; 108, pre-pressure adjusting gasket; 109, first bearing; 110, auxiliary adjusting gasket; 111, input friction disc; 112, output friction disc assembly; 1121, output friction disc; 1122, friction plate; 113, shell; 114, pre-pressure adjusting nut; 115, third bearing; 116, output shaft; 117, bearing gland; 118, second bearing; 2, gasket; 3, harmonic reducer; 301, wave generator; 302, flexible gear; 303, steel wheel; 304, special-shaped bearing; 3041, special-shaped bearing inner ring; 3042, special-shaped bearing outer ring; 305, sealing ring; 4, motor shaft; 5, encoder support; and 6, high-precision encoder assembly.

Figure 5:
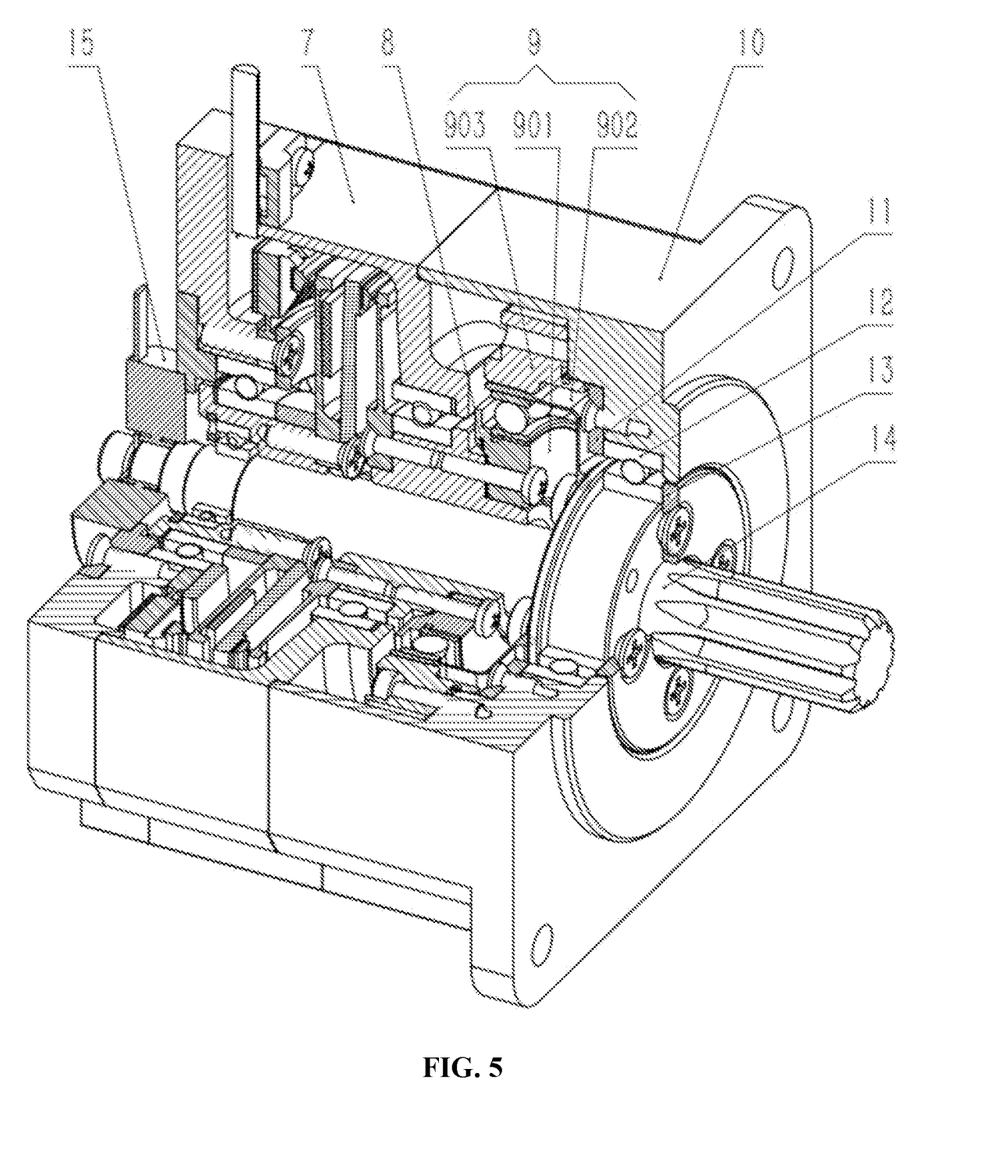
FIG. 5 is a structural schematic diagram of a preferred embodiment II provided by the present disclosure.
Figure 6:
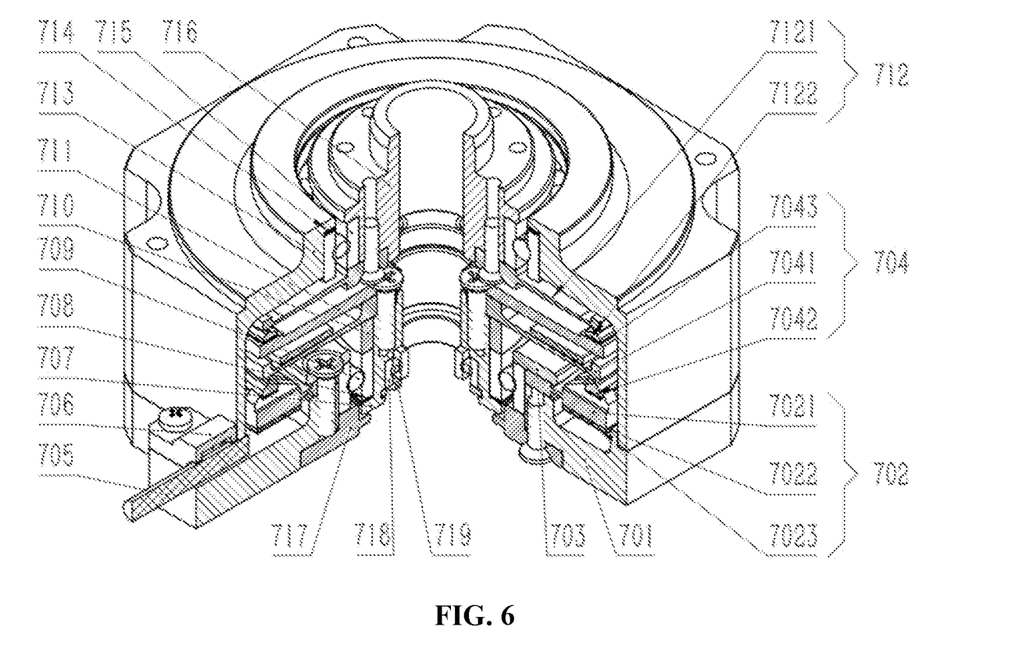
FIG. 6 is a structural schematic diagram of an ultrasonic motor body in the preferred embodiment II provided by the present disclosure.
Figure 7:
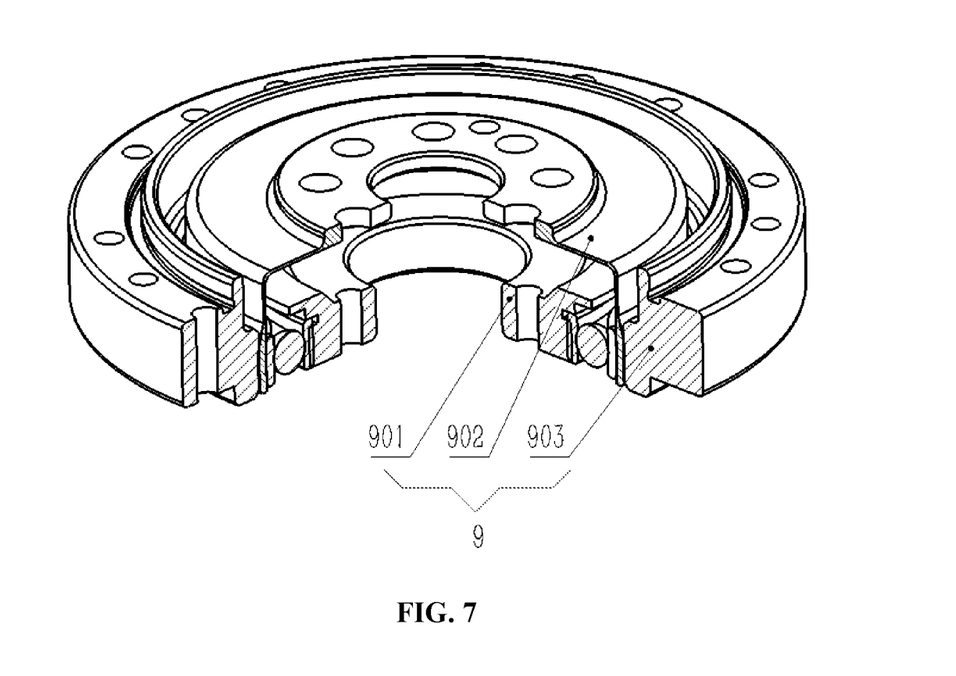
FIG. 7 is a structural schematic diagram of a harmonic reducer in the preferred embodiment II provided by the present disclosure.

In FIG. 5 to FIG. 7, 7, ultrasonic motor body with self-protection function; 701, stator seat; 702, stator assembly; 7021, stator; 7022, piezoelectric ceramic piece; 7023, flexible printed board; 703, stator gland; 704, flexible rotor assembly; 7041, rotor; 7042, friction material; 7043, damping rubber; 705, motor lead cable; 706, wire pressing buckle; 707, rotor shaft; 708, pre-pressure adjusting gasket; 709, first bearing; 710, auxiliary adjusting gasket; 711, input friction disc; 712, output friction disc assembly; 7121, output friction disc; 7122, friction plate; 713, shell; 714, pre-pressure adjusting nut; 715, third bearing; 716, output shaft; 717, first bearing gland; 718, second bearing; 8, gasket; 9, harmonic reducer; 901, wave generator; 902, flexible gear; 903, steel wheel; 10, front end shell; 11, second bearing gland; 12, fourth bearing; 13, third bearing gland; 14, motor shaft; and 15, high-precision encoder assembly.

DETAILED DESCRIPTION OF THE EMBODIMENTS

The following describes the present disclosure in detail with reference to the attached figures. In the description of the present disclosure, it needs to be illustrated that the indicative direction or position relations of the terms such as "left side", "right side", "upper part", "lower part", "top end" and "bottom end" are direction or position relations illustrated based on the accompanying diagrams, just for facilitating the description of the present disclosure and simplifying the description, but not for indicating or hinting that the indicated device or element must be in a specific direction and is constructed and operated in the specific direction, the terms "first", "second", "third" and "fourth" do not represent the importance degree of components and parts and cannot be understood as the restriction of the present disclosure. Specific dimensions adopted in the embodiment are merely to exemplify the technical scheme and do not limit the scope of protection of the present disclosure.

As explained in the background art, in some specific application occasions, the motor needs to be small in size, large in output torque and low in output rotating speed. It is obvious that the motor in the prior art cannot achieve all the effects, and does not have the self-protection function. In the using process of the motor, the load can only be manually controlled not to exceed the allowable maximum working torque, and hence in case of human errors, such the loaded load exceeding the allowable maximum working torque, and sudden jamming of the system at the output end due to a certain fault, the ultrasonic motor is locked, and the friction contact surface between the stator and the rotor of the ultrasonic motor is damaged.

In view of above, the application aims to provide the ultrasonic motor which can be applied in occasions where the motor is required to have a small size, a super-large output torque and a super-slow output rotating speed, and the motor has a self-protection function to avoid damage to the friction contact surface between the stator and the rotor.

It needs to be explained in advance that the advantages of the ultrasonic motor are combined with the advantages of the harmonic reducer, so that the output rotating speed of the ultrasonic motor is reduced, the output torque is improved, and the output angular resolution is improved; a torque limiting protection device is additionally arranged in the structure of the ultrasonic motor body, to avoid a damage to the friction contact surface between the stator and the rotor; and a high-precision encoder is added to feed back angle position information in real time. Of course, all the components must cooperate, so that the final effect can be achieved through the matched position relation.

Figure 1:
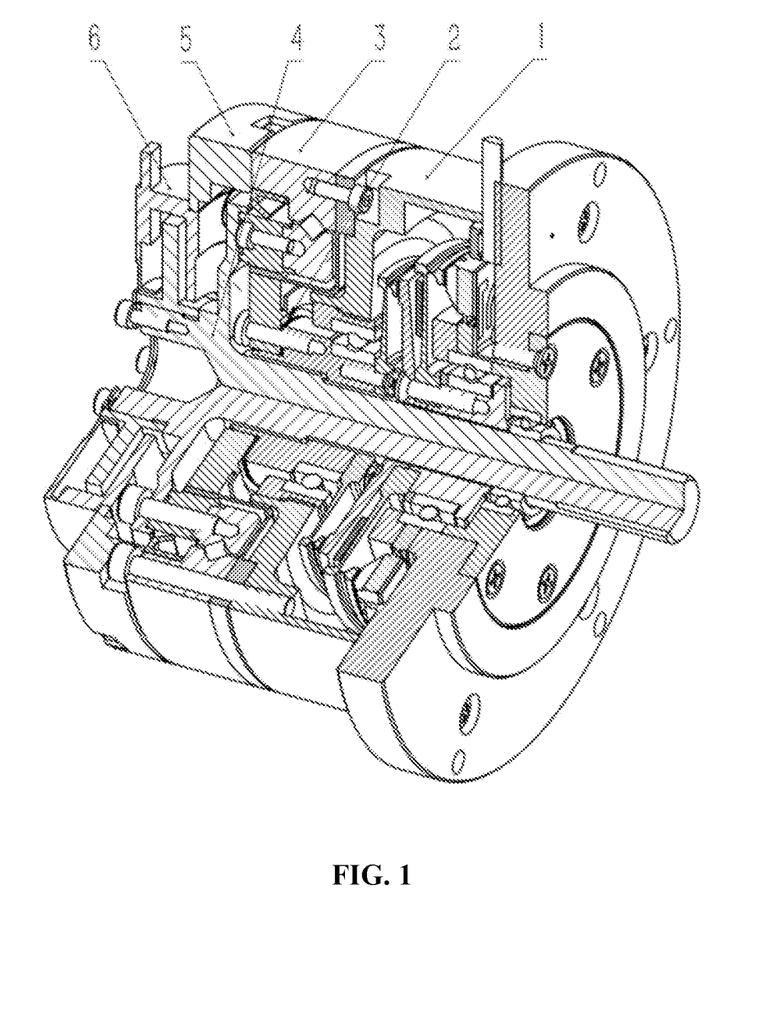
FIG. 1 is a structural schematic diagram of a preferred embodiment I provided by the present disclosure.

In embodiment I provided by the present disclosure, as shown in FIG. 1 to FIG. 4, a high-torque and high-precision ultrasonic motor with a self-protection function comprises an ultrasonic motor body 1, a gasket 2, a harmonic reducer 3, a motor shaft 4, an encoder support 5 and a high-precision encoder assembly 6. In order to directionally elaborate the structure, as shown in FIG. 1, the end, close to the motor shaft, of the ultrasonic motor body is defined as a top end, and the gasket, the harmonic reducer, the encoder support and the high-precision encoder assembly are sequentially arranged from the ultrasonic motor body to the bottom end of the motor shaft.

Figure 2:
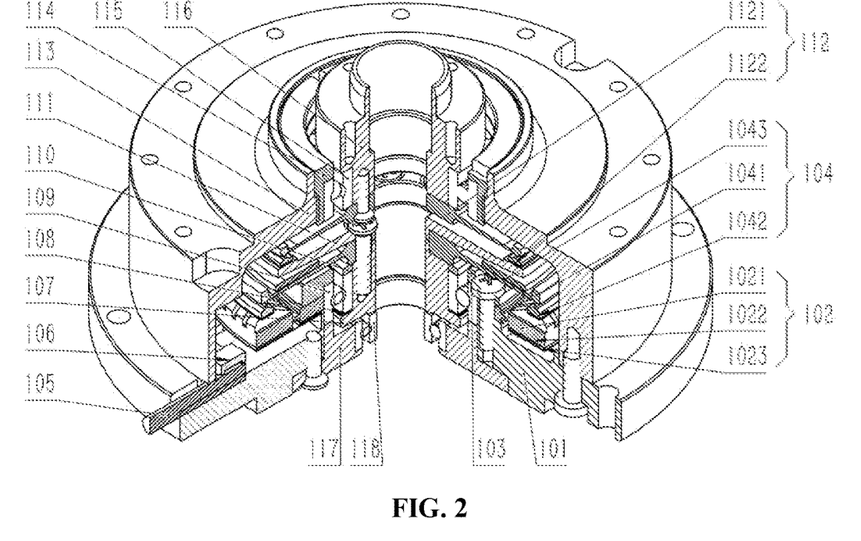
FIG. 2 is a structural schematic diagram of an ultrasonic motor body in the preferred embodiment I provided by the present disclosure.

In the present disclosure, as shown in FIG. 2, the ultrasonic motor body comprises a stator seat 2, a bearing end cover, a second bearing, a stator assembly 102, a stator gland 103, a first bearing 109, a rotor assembly, a rotor shaft 107, a pre-pressure adjusting gasket 108, an auxiliary adjusting gasket 110, an input friction disc 111, an output friction disc assembly 112, an output shaft, a pre-pressure adjusting nut 114, a shell 113 and a third bearing 115. A threaded hole coaxial with the motor shaft is formed in the center of the shell close to the bottom end of the motor shaft. A third bearing is embedded in the pre-pressure adjusting nut and inserted into the threaded hole formed in the center of the shell. The output shaft 116 is coaxially and fixedly connected with the output friction disc assembly, and together with the motor shaft, coaxially penetrate through the third bearing embedded in the pre-pressure adjusting nut. A bearing hole coaxial with the motor shaft is formed in the center of the stator seat, and the depth of the bearing hole is ½-⅘ of the thickness of the first bearing. The first bearing is embedded in the bearing hole formed in the center of the stator seat, and the rotor shaft and the motor shaft coaxially penetrate through the stator seat and the first bearing. The stator assembly is further arranged on the surface of the stator seat, and the upper surface of an inner ring of the stator assembly is covered with the stator gland. The flexible rotor assembly 104 and the input friction disc are sequentially arranged on the surface of the stator assembly and are sleeved on the rotor shaft.

The stator assembly comprises a flexible printed board 1023, a piezoelectric ceramic piece 1022 and a stator 1021, which are coaxially and sequentially sleeved on a convex cylinder arranged in the stator seat from the top end of the motor shaft to the bottom end of the motor shaft. The flexible rotor assembly comprises a friction material 1042, a rotor 1041 and damping rubber 1043, which are coaxially and sequentially stacked in the direction from the top end of the motor shaft to the bottom end of the motor shaft.

The rotor shaft of a hollow structure penetrates through the first bearing, and between the first bearing and the rotor shaft, the pre-pressure adjusting gasket 2 is arranged as well as the auxiliary adjusting gasket, so that the pre-pressure between the rotor assembly and the stator assembly can be adjusted by adjusting the thicknesses of the pre-pressure adjusting gasket and the auxiliary adjusting gasket.

The bearing gland 117 is arranged at the spigot end, close to the top end of the motor shaft, of the stator seat, and the second bearing 118 is coaxially arranged on the inner side of the bearing gland.

In the present disclosure, as shown in FIG. 2, the ultrasonic motor body is provided with a torque limiting protection device, and includes two friction pairs, namely a first friction pair consisting of the tooth surface of the stator assembly and the friction material surface of the flexible rotor assembly, which is deemed as an ultrasonic motor driven friction pair; and a second friction pair consisting of the outer ring surface of the input friction disc and the surface of the friction plate 1122 of the output friction disc assembly, which is deemed as a torque protection device friction pair.

The torque limiting protection device capable of avoiding damage to the friction contact surface between the stator and the rotor is implemented in the present disclosure. As shown in FIG. 2, the input friction disc is arranged on the surface of an inner web plate of the rotor and is fixedly connected with the rotor shaft. The output friction disc assembly is stacked on the surface of the input friction disc and includes an output friction disc 1121 and a friction plate. An inner web plate of the output friction disc is fixedly arranged on the output shaft penetrating through the third bearing, in which the center of the shell is sleeved with a pre-pressure adjusting nut, a third bearing is embedded in an inner hole of the pre-pressure adjusting nut, and by rotating the pre-pressure adjusting nut, the pre-pressure between the input friction disc and the output friction disc assembly can be adjusted, and in turn the static friction force between the input friction disc and the output friction disc assembly is adjusted. During specific implementation, the maximum torque transmitted by the output shaft of the ultrasonic motor body depends on the static friction torque between the input friction disc and the output friction disc assembly, and thus the friction contact surface between the stator of the ultrasonic motor body and the rotor of the ultrasonic motor body won't be damaged as well as the harmonic reducer 3, as long as the static friction torque meets certain requirements.

In the present disclosure, the components for meeting the requirements of output rotating speed, torque and angle position of the ultrasonic motor include a harmonic reducer and a high-precision encoder assembly, and also include some auxiliary structures such as a gasket and an encoder support. During installation, the gasket, the harmonic reducer, the encoder support and the high-precision encoder assembly are sequentially arranged from the ultrasonic motor body to the bottom end of the motor shaft.

Figure 3:
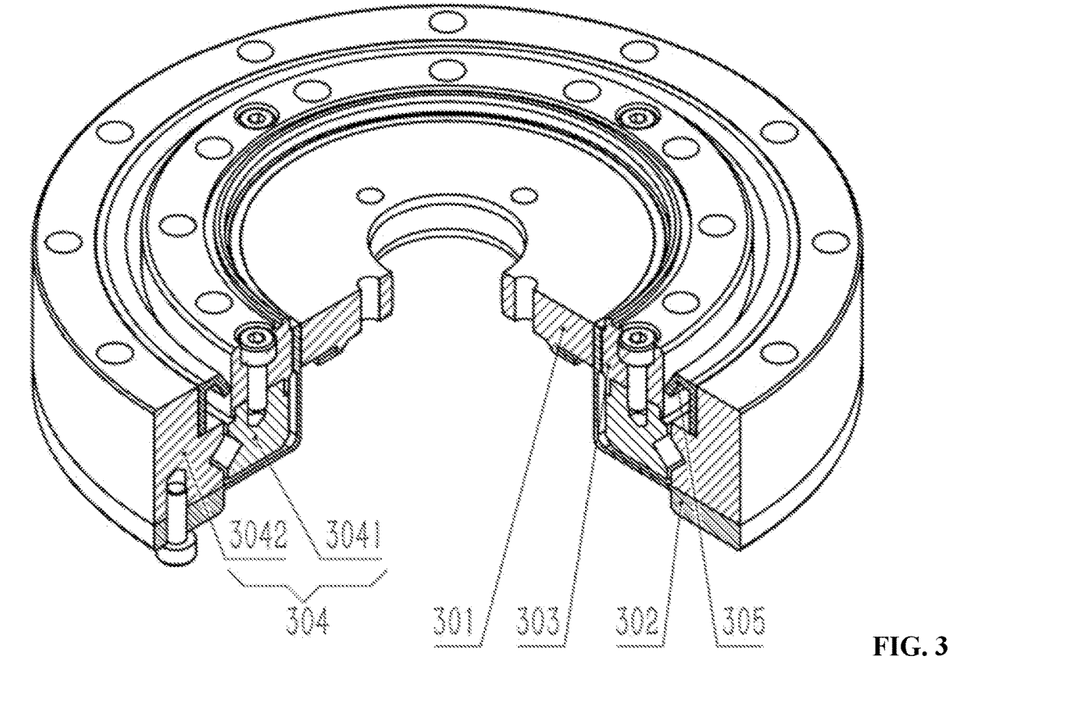
FIG. 3 is a structural schematic diagram of a harmonic reducer in the preferred embodiment I provided by the present disclosure.
Figure 4:
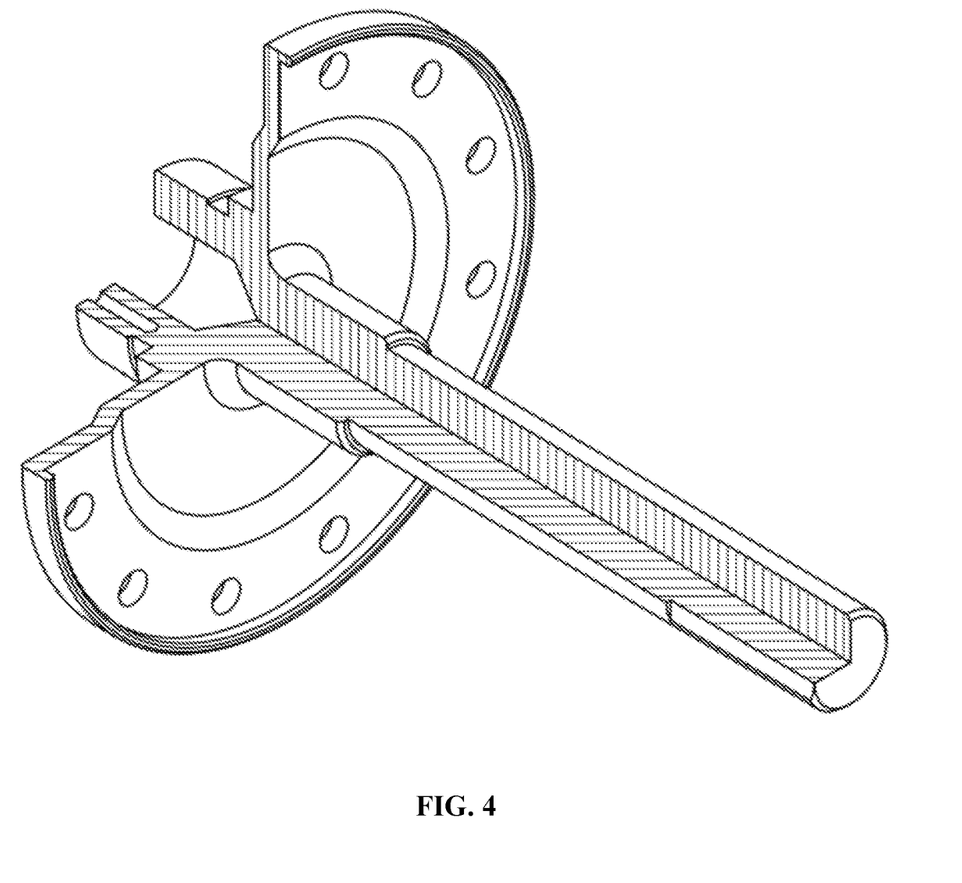
FIG. 4 is a structural schematic diagram of a motor shaft in the preferred embodiment I provided by the present disclosure.

As shown in FIG. 3, the harmonic reducer comprises a wave generator 301, a flexible gear 302, a steel wheel 303, a special-shaped bearing and a sealing ring 305. The wave generator is coaxially sleeved on the output shaft with the central axis of the motor shaft as the central line, and the gasket is arranged between the output shaft and the wave generator, so that the distance between the end face of the wave generator and the end face of the flexible gear can be adjusted by changing the thickness of the gasket. One end face of the steel wheel is coaxially and fixedly installed on the end face of a special-shaped bearing inner ring 3041, and the other end face of the steel wheel is fixedly connected with a flange plate of the motor shaft. The flexible gear is coaxially and fixedly installed on the end face of a special-shaped bearing outer ring 3042, the special-shaped bearing outer ring and the flexible gear are coaxially and fixedly installed on the shell, and the sealing ring is embedded between the special-shaped bearing outer ring and the steel wheel.

The high-precision encoder assembly comprises a coded disc and an encoder shell including an encoder reading head. The coded disc of the encoder is fixedly arranged at the position, close to the bottom end, of the motor shaft in a sleeving mode, and is covered with the encoder shell, in which the encoder support is coaxially installed on the special-shaped bearing outer ring, and the encoder shell including the encoder reading head and the encoder support are fixed together.

In the structure, with the cooperation of harmonic reducer, the output shaft of the ultrasonic motor body with a self-protection function outputs, to the wave generator of the harmonic reducer, a rotating speed and a torque, which are then subjected to deceleration and torque increase, and finally output through the motor shaft. The high-precision encoder assembly feeds back the output rotating speed and angle position information of the motor shaft, so that the output rotating speed of the ultrasonic motor is greatly reduced, and the output torque and the output angle resolution are greatly improved. Through the cooperation between the input friction disc and the output friction disc assembly, the ultrasonic motor body with a self-protection function cannot operate at the maximum torque, so damage to the friction contact surface between the stator of the ultrasonic motor body and the rotor of the ultrasonic motor body is avoided. When the output end is jammed or the load torque is too large, the input friction disc and the output friction disc assembly experience sliding friction, and thus the harmonic reducer can be prevented from being damaged, as well as the friction contact surface between the stator of the ultrasonic motor body and the rotor of the ultrasonic motor body.

Specifically, further description will be presented in combination with the implementation mode. Firstly, the maximum torque output by the ultrasonic motor driven friction pair including a stator assembly and a flexible rotor assembly is denoted by $T_3$, the maximum working torque output by the ultrasonic motor driven friction pair including a stator assembly and a flexible rotor assembly is denoted by $T_1$, the static friction torque of the torque protection device friction pair including an input friction disc and an output friction disc assembly is denoted by $T_2$, the maximum torque instantaneously allowed by the harmonic reducer is denoted by $T_4$, and the output reduction ratio of the harmonic reducer is denoted by i, in which $T_1$ is 70%-85% of $T_3$, namely $T_1$ is equal to (70%-85%)·$T_3$, the static friction torque $T_2$ is smaller than or equal to the maximum working torque $T_1$, the static friction torque $T_2$ is smaller than or equal to $T_4/i$, and the upper limit value of the static friction torque $T_2$ is the smaller value of $T_1$ and $T_4/i$.

When $T_1$ is smaller than or equal to $T_4/i$, that is $T_2$ is equal to $T_1$, in the case that the load applied to the output end of the motor is larger than or equal to i·$T_2$ (including the case that the motor shaft is jammed at the load end of the motor due to fault), after the torque transmitted back to the torque protection device friction pair reaches the static friction torque limit value $T_1$, the torque protection device friction pair slips, namely, the input friction disc and the output friction disc assembly slip. At the moment, the actual torque borne by the harmonic reducer is i·$T_1$ (since the maximum torque of transmission depends on the maximum static friction torque of the torque protection device friction pair), but i·$T_1$ is smaller than or equal to $T_4$, namely, the flexible gear of the harmonic reducer, teeth on the flexible gear and teeth on the steel wheel cannot be damaged, thereby protecting the harmonic reducer. Furthermore, the actual torque transmitted back to the ultrasonic motor driven friction pair is $T_1$, $T_1$ is equal to $T_2$ and smaller than $T_3$, namely the ultrasonic motor body cannot use the maximum torque $T_3$ (namely in a locked-rotor state), so that the friction contact surface between the stator and the rotor are avoided from being damaged, and the ultrasonic motor body is protected.

When $T_1$ is greater than $T_4/i$, $T_2$ is equal to $T_4/i$, in the case that the load applied to the output end of the motor is larger than or equal to $T_4$ (including the case that the motor shaft is jammed at the load end of the motor due to fault), after the torque transmitted back to the torque protection device friction pair reaches the static friction torque limit value $T_4/i$, the torque protection device friction pair slips, namely, the input friction disc and the output friction disc assembly slip. At the moment, the actual torque borne by the harmonic reducer is $T_4$ (since the maximum torque of transmission depends on the maximum static friction torque of the torque protection device friction pair), namely, the flexible gear of the harmonic reducer, teeth on the flexible gear and teeth on the steel wheel cannot be damaged, so that the harmonic reducer is protected. Moreover, the actual torque transmitted back to the ultrasonic motor driven friction pair is $T_4/i$, $T_4/i$ is equal to $T_2$ and smaller than $T_1$ and smaller than $T_3$, namely the ultrasonic motor body cannot use the maximum torque $T_3$ (namely in a locked-rotor state), so that the friction contact surface between the stator and the rotor are avoided from being damaged, and the ultrasonic motor body is protected.

The calculation formula of output reduction ratio $i_2$ of the steel wheel of the harmonic reducer is as follows.

$$i_2 = \frac{1}{R_2} = \frac{Z_c - Z_f}{Z_c}$$

where, $Z_c$ denotes a number of teeth of the steel wheel, $Z_f$ denotes a number of teeth of the flexible gear, and $R_2$ denotes the rated speed ratio output by the steel wheel.

According to embodiment I as shown in FIG. 1 to FIG. 4, the harmonic reducer for achieving the expected effect of the torque, the rotating speed and the output angle resolution is arranged behind the ultrasonic motor body, namely, from the view angle of FIG. 1, and is close to the bottom end of the motor shaft, The encoder support and the encoder assembly are sequentially arranged between the harmonic reducer and the bottom end of the motor shaft. A output from the output shaft of the ultrasonic motor body is input to the wave generator 901 of the harmonic reducer, passes through the steel wheel of the harmonic reducer, and finally outputs through the motor shaft penetrating through the harmonic reducer and the ultrasonic motor body.

Then, the present disclosure further provides another embodiment II. As shown in FIG. 5 to FIG. 6, in the structure, a stator assembly 702, a stator seat 701, a stator 7021, a piezoelectric ceramic piece 7022, a flexible printed circuit board 7023, a stator gland 703, a flexible rotor assembly 704, a first bearing 709, an auxiliary adjusting gasket 710, a pre-pressure adjusting gasket 708, and a first bearing gland 717 (corresponding to the bearing gland 117 in embodiment I) can be configured and arranged with reference to embodiment I. Now, the differences from embodiment I are mainly illustrated as follows.

Firstly, the application mode of the pre-pressure of the torque limiting protection device for avoiding the damage of the friction contact surface between the stator and the rotor is implemented. As shown in FIG. 6, the input friction disc 711 is arranged on the surface of an inner web plate of the rotor and is fixedly connected with the rotor shaft 707. The output friction disc assembly 712 is stacked on the surface of the input friction disc and includes an output friction disc 7121 and a friction plate 7122. An inner web plate of the output friction disc is fixedly arranged on the output shaft 716 penetrating through the third bearing 715, in which a friction disc pre-pressure adjusting gasket 714 is embedded between the inner side of the shell 713 and the third bearing, namely, in embodiment II, the pre-pressure is applied by replacing pre-pressure adjusting gaskets of different thicknesses.

Secondly, a second bearing 718 is directly arranged in the rotor shaft, and a second bearing gland 11 is pressed on the second bearing. An outer ring of the second bearing rotates along with the rotor shaft, and an inner ring of the second bearing rotates along with the motor shaft. Thirdly, in the structure according to embodiment II, taking the view angle of FIG. 5 as an example and assuming that the right side of the motor shaft is the top end, a harmonic reducer 9, a gasket 8, an ultrasonic motor body 7 and a high-precision encoder assembly 15 are sequentially sleeved on the motor shaft from the top end to the bottom end of the motor shaft. A steel wheel 903 of the harmonic reducer (the structure of the harmonic reducer in embodiment II is as shown in FIG. 7) is fixedly installed on a front end shell 10, a fourth bearing 12 is further embedded between the front end shell and the motor shaft, and an outer ring of the fourth bearing is pressed through a third bearing gland 13. A flexible gear 902 of the harmonic reducer is fixedly connected with the motor shaft 14, and an output from the output shaft of the ultrasonic motor body is input into a wave generator of the harmonic reducer, passes through the flexible gear of the harmonic reducer and finally outputs through the motor shaft penetrating through the harmonic reducer and the ultrasonic motor body.

It needs to be additionally stated that in embodiment II the output reduction ratio of harmonic reducer flexure gear is involved and defined as $i_1$, and then the calculation equation is expressed as follows.

$$i_1 = \frac{1}{R_1} = \frac{Z_f - Z_c}{Z_f},$$

where, $Z_c$ is a number of teeth of the steel wheel, $Z_f$ is a number of teeth of the flexible gear, and $R_1$ is a rated speed ratio output by the flexible gear.

Thirdly, when a harmonic reducer with the same reduction ratio is adopted, in comparison with embodiment I, the structure according to embodiment II generally has more compact structure, smaller overall dimension, and lighter mass.

Finally, it should be noted that the motor shaft (reference number 4 in FIG. 1 and reference number 14 in FIG. 5) in the present disclosure is not limited only to the structure presented in the figures, and the motor shaft may be a square shaft, a spline shaft, a gear shaft, or the like in practical applications.

In the two implantation modes presented in FIG. 2 and FIG. 5, a wire pressing buckle 106 or 706 and a motor lead cable are further involved, and the motor lead cable 105 or 705 is arranged on the surface of the stator seat, extends out of the stator seat and is pressed by the wire pressing buckle.

Those skilled in the art can understand that, unless otherwise defined, all terms (including technical and scientific terms) used herein have the same meanings as commonly understood by those skilled in the art to which the present disclosure belongs. It should be further understood that terms, such as those defined in commonly used dictionaries, should be interpreted as having a meaning that is consistent with the meaning in the context in the prior art and will not be interpreted in an idealized or overly formal sense unless specifically defined herein.

The meaning of "and/or" as used herein is intended to mean that the cases where each is present alone or both are included.

As used herein, "connected" may mean either direct connection between components or indirect connection between components through other components.

By taking the ideal embodiment of the present disclosure as an inspiration, through the explanation content, related workers can carry out various changes and modifications without deviating from the range of the technical idea of the present disclosure. The technical scope of the present disclosure is not limited to the contents of the description and must be determined according to the scope of the claims to determine the technical scope.

What is claimed is:

1. A high-torque and high-precision ultrasonic motor with a self-protection function, comprising an ultrasonic motor body, a gasket, a harmonic reducer, a motor shaft, an encoder support and a high-precision encoder assembly, wherein
the gasket is sleeved on an output shaft of the ultrasonic motor body, the harmonic reducer is sleeved to a shell of the ultrasonic motor body, the motor shaft penetrates through the ultrasonic motor body, an end, close to the motor shaft, of the ultrasonic motor body is defined as a top end, and a bottom end of the motor shaft is sequentially sleeved with the encoder support and the high-precision encoder assembly; and
the gasket, the harmonic reducer, the encoder support and the high-precision encoder assembly are sequentially arranged from the ultrasonic motor body to the bottom end of the motor shaft.

2. The high-torque and high-precision ultrasonic motor with a self-protection function according to claim 1, wherein the ultrasonic motor body comprises a stator seat, a bearing end cover, a second bearing, a stator assembly, a stator gland, a first bearing, a flexible rotor assembly, a rotor shaft, a pre-pressure adjusting gasket, an auxiliary adjusting gasket, an input friction disc, an output friction disc assembly, an output shaft, a pre-pressure adjusting nut, a shell and a third bearing, a threaded hole coaxial with the motor shaft is formed in the center of the shell close to the bottom end of the motor shaft, and a third bearing is embedded in the pre-pressure adjusting nut and inserted in the threaded hole formed in the center of the shell;

the output shaft is coaxially and fixedly connected with the output friction disc assembly, and the output shaft and the motor shaft coaxially penetrate through the third bearing embedded in the pre-pressure adjusting nut;

a bearing hole coaxial with the motor shaft is formed in the center of the stator seat, the depth of the bearing hole is ½-⅘ of the thickness of the first bearing, the first bearing is embedded in the bearing hole formed in the center of the stator seat, and the rotor shaft and the motor shaft coaxially penetrate through the stator seat and the first bearing; and the stator assembly is further arranged on the surface of the stator seat, the upper surface of an inner ring of the stator assembly is covered with the stator gland, and the flexible rotor assembly and the input friction disc are sequentially arranged on the surface of the stator assembly and sleeved on the rotor shaft.

3. The high-torque and high-precision ultrasonic motor with a self-protection function according to claim 2, wherein the stator assembly comprises a flexible printed board, a piezoelectric ceramic piece and a stator, and the flexible printed board, the piezoelectric ceramic piece and the stator are coaxially and sequentially sleeved on a convex cylinder arranged in the stator seat from the top end of the motor shaft to the bottom end of the motor shaft; and the flexible rotor assembly comprises a friction material, a rotor and damping rubber, and the friction material, the rotor and the damping rubber are coaxially and sequentially stacked in the direction from the top end of the motor shaft to the bottom end of the motor shaft.

4. The high-torque and high-precision ultrasonic motor with a self-protection function according to claim 3, wherein the rotor shaft penetrates through the first bearing and is of a hollow structure, the pre-pressure adjusting gasket is arranged between the first bearing and the rotor shaft, and the auxiliary adjusting gasket is arranged between the first bearing and the flexible rotor assembly.

5. The high-torque and high-precision ultrasonic motor with a self-protection function according to claim 4, wherein the bearing gland is arranged at the spigot end, close to the top end of the motor shaft, of the stator seat, and the second bearing is coaxially arranged on the inner side of the bearing gland;

the input friction disc is arranged on the surface of an inner web plate of the rotor and is fixedly connected with the rotor shaft; and the output friction disc assembly is stacked on the surface of the input friction disc and comprises an output friction disc and a friction plate, and an inner web plate of the output friction disc is fixedly arranged on the output shaft penetrating through the third bearing.

6. The high-torque and high-precision ultrasonic motor with a self-protection function according to claim 2, wherein the ultrasonic motor body comprises two friction pairs, the tooth surface of the stator assembly and the friction material surface of the flexible rotor assembly form the first friction pair which is an ultrasonic motor driven friction pair, and the outer ring surface of the input friction disc and the surface of the friction plate of the output friction disc assembly form the second friction pair which is a torque protection device friction pair; and the torque protection device friction pair is a torque limiting protection device of the ultrasonic motor body.

7. The high-torque and high-precision ultrasonic motor with a self-protection function according to claim 6, wherein the harmonic reducer comprises a wave generator, a flexible gear, a steel wheel, a special-shaped bearing and a sealing ring, the wave generator is coaxially sleeved on the output shaft with the central axis of the motor shaft as the central line, and the gasket is arranged between the output shaft and the wave generator;

one end face of the steel wheel is coaxially and fixedly installed on the end face of a special-shaped bearing inner ring, and the other end face of the steel wheel is fixedly connected with a flange plate of the motor shaft;

the flexible gear is coaxially and fixedly installed on the end face of a special-shaped bearing outer ring, and meanwhile the special-shaped bearing outer ring and the flexible gear are coaxially and fixedly installed on the shell; and the sealing ring is embedded between the special-shaped bearing outer ring and the steel wheel.

8. The high-torque and high-precision ultrasonic motor with a self-protection function according to claim 7, wherein the high-precision encoder assembly comprises an encoder coded disc and an encoder shell;

the encoder coded disc is fixedly arranged at the position, close to the bottom end, of the motor shaft in a sleeving mode, and the coded disc is covered with the encoder shell, wherein the encoder support is coaxially installed on the special-shaped bearing outer ring, and the encoder shell and the encoder support are fixed; and the encoder shell also comprises an encoder reading head.

9. An implementation mode of the high-torque and high-precision ultrasonic motor with a self-protection function according to claim 1, wherein the output shaft of the ultrasonic motor body outputs rotating speed and torque to the wave generator of the harmonic reducer, the rotating speed and torque are output through the motor shaft, and the high-precision encoder assembly feeds back the output rotating speed and angle position information of the motor shaft.

10. The implementation mode of the high-torque and high-precision ultrasonic motor with a self-protection function according to claim 9, wherein the ultrasonic motor body comprises a stator seat, a bearing end cover, a second bearing, a stator assembly, a stator gland, a first bearing, a flexible rotor assembly, a rotor shaft, a pre-pressure adjusting gasket, an auxiliary adjusting gasket, an input friction disc, an output friction disc assembly, an output shaft, a pre-pressure adjusting nut, a shell and a third bearing, a threaded hole coaxial with the motor shaft is formed in the center of the shell close to the bottom end of the motor shaft, and a third bearing is embedded in the pre-pressure adjusting nut and inserted into the threaded hole formed in the center of the shell;

the output shaft is coaxially and fixedly connected with the output friction disc assembly, and the output shaft and the motor shaft coaxially penetrate through the third bearing embedded in the pre-pressure adjusting nut;

a bearing hole coaxial with the motor shaft is formed in the center of the stator seat, the depth of the bearing hole is ½-⅘ of the thickness of the first bearing, the first bearing is embedded in the bearing hole formed in the center of the stator seat, and the rotor shaft and the motor shaft coaxially penetrate through the stator seat and the first bearing; and the stator assembly is further arranged on the surface of the stator seat, the upper surface of an inner ring of the stator assembly is covered with the stator gland, and the flexible rotor assembly and the input friction disc are sequentially arranged on the surface of the stator assembly and sleeved on the rotor shaft.

11. The implementation mode of the high-torque and high-precision ultrasonic motor with a self-protection function according to claim 10, wherein the stator assembly comprises a flexible printed board, a piezoelectric ceramic piece and a stator, and the flexible printed board, the piezoelectric ceramic piece and the stator are coaxially and sequentially sleeved on a convex cylinder arranged in the stator seat from the top end of the motor shaft to the bottom end of the motor shaft; and the flexible rotor assembly comprises a friction material, a rotor and damping rubber, and the friction material, the rotor and the damping rubber are coaxially and sequentially stacked in the direction from the top end of the motor shaft to the bottom end of the motor shaft.

12. The implementation mode of the high-torque and high-precision ultrasonic motor with a self-protection function according to claim 11, wherein the rotor shaft penetrates through the first bearing and is of a hollow structure, the pre-pressure adjusting gasket is arranged between the first bearing and the rotor shaft, and the auxiliary adjusting gasket is arranged between the first bearing and the flexible rotor assembly.

13. The implementation mode of the high-torque and high-precision ultrasonic motor with a self-protection function according to claim 12, wherein the bearing gland is arranged at the spigot end, close to the top end of the motor shaft, of the stator seat, and the second bearing is coaxially arranged on the inner side of the bearing gland;

the input friction disc is arranged on the surface of an inner web plate of the rotor and is fixedly connected with the rotor shaft; and the output friction disc assembly is stacked on the surface of the input friction disc and comprises an output friction disc and a friction plate, and an inner web plate of the output friction disc is fixedly arranged on the output shaft penetrating through the third bearing.

14. The implementation mode of the high-torque and high-precision ultrasonic motor with a self-protection function according to claim 10, wherein the ultrasonic motor body comprises two friction pairs, the tooth surface of the stator assembly and the friction material surface of the flexible rotor assembly form the first friction pair which is an ultrasonic motor driven friction pair, and the outer ring surface of the input friction disc and the surface of the friction plate of the output friction disc assembly form the second friction pair which is a torque protection device friction pair; and the torque protection device friction pair is a torque limiting protection device of the ultrasonic motor body.

15. The implementation mode of the high-torque and high-precision ultrasonic motor with a self-protection function according to claim 14, wherein the harmonic reducer comprises a wave generator, a flexible gear, a steel wheel, a special-shaped bearing and a sealing ring, the wave generator is coaxially sleeved on the output shaft with the central axis of the motor shaft as the central line, and the gasket is arranged between the output shaft and the wave generator;

one end face of the steel wheel is coaxially and fixedly installed on the end face of a special-shaped bearing inner ring, and the other end face of the steel wheel is fixedly connected with a flange plate of the motor shaft; the flexible gear is coaxially and fixedly installed on the end face of a special-shaped bearing outer ring, and meanwhile the special-shaped bearing outer ring and the flexible gear are coaxially and fixedly installed on the shell; and the sealing ring is embedded between the special-shaped bearing outer ring and the steel wheel.

16. The implementation mode of the high-torque and high-precision ultrasonic motor with a self-protection function according to claim 15, wherein the high-precision encoder assembly comprises an encoder coded disc and an encoder shell;

the encoder coded disc is fixedly arranged at the position, close to the bottom end, of the motor shaft in a sleeving mode, and the coded disc is covered with the encoder shell, wherein the encoder support is coaxially installed on the special-shaped bearing outer ring, and the encoder shell and the encoder support are fixed; and the encoder shell also comprises an encoder reading head.

17. The implementation mode of the high-torque and high-precision ultrasonic motor with a self-protection function according to claim 9, wherein a maximum torque output by the ultrasonic motor driven friction pair is denoted by $T_3$, a maximum working torque output by the ultrasonic motor driven friction pair is denoted by $T_1$, a static friction torque of the torque protection device friction pair is denoted by $T_2$, a maximum torque instantaneously allowed by the harmonic reducer is denoted by $T_4$, and a output reduction ratio of the harmonic reducer is denoted by i, $T_1$ is 70%-85% of $T_3$, namely $T_1$ is equal to (70%-85%)·$T_3$, the static friction torque $T_2$ is smaller than or equal to the maximum working torque $T_1$, and, the static friction torque $T_2$ is smaller than or equal to $T_4/i$, and the upper limit value of the static friction torque $T_2$ is a smaller value of $T_1$ and $T_4/i$;

when $T_1$ is smaller than or equal to $T_4/i$, that is $T_2$ is equal to $T_1$, in a case that the load applied to the output end of the motor is larger than or equal to i·$T_2$, after the torque transmitted back to the torque protection device friction pair reaches the static friction torque limit value $T_1$, the torque protection device friction pair slips, and at the moment, the actual torque borne by the harmonic reducer is i·$T_1$, the actual torque transmitted back to the ultrasonic motor driven friction pair is $T_1$, $T_1$ is equal to $T_2$ and smaller than $T_3$ and i·$T_1$ is smaller than or equal to $T_4$, so that the friction contact surface between the stator of the ultrasonic motor body and the rotor of the ultrasonic motor body is not damaged, and the harmonic reducer is not damaged; and when $T_1$ is greater than $T_4/i$, namely $T_2$ is equal to $T_1$, in a case that the load applied to the output end of the motor is larger than or equal to $T_4$, after the torque transmitted back to the torque protection device friction pair reaches the static friction torque limit value $T_4/i$, the torque protection device friction pair slips, and at the moment, the actual torque borne by the harmonic reducer is $T_4$, the actual torque transmitted back to the ultrasonic motor driven friction pair is $T_4/i$, $T_4/i$ is equal to $T_2$ and smaller than $T_1$, and $T_1$ is smaller than $T_3$, so that the friction contact surface between the stator of the ultrasonic motor body and the rotor of the ultrasonic motor body is not damaged, and the harmonic reducer is not damaged.

18. The implementation mode of the high-torque and high-precision ultrasonic motor with a self-protection function according to claim 10, wherein a maximum torque output by the ultrasonic motor driven friction pair is denoted by $T_3$, a maximum working torque output by the ultrasonic motor driven friction pair is denoted by $T_1$, a static friction torque of the torque protection device friction pair is denoted by $T_2$, a maximum torque instantaneously allowed by the harmonic reducer is denoted by $T_4$, and a output reduction ratio of the harmonic reducer is denoted by i, $T_1$ is 70%-85% of $T_3$, namely $T_1$ is equal to $(70\%-85\%) \cdot T_3$, the static friction torque $T_2$ is smaller than or equal to the maximum working torque $T_1$, and, the static friction torque $T_2$ is smaller than or equal to $T_4/i$, and the upper limit value of the static friction torque $T_2$ is a smaller value of $T_1$ and $T_4/i$;

when $T_1$ is smaller than or equal to $T_4/i$, namely $T_2$ is equal to $T_1$, in a case that the load applied to the output end of the motor is larger than or equal to $i \cdot T_2$, after the torque transmitted back to the torque protection device friction pair reaches the static friction torque limit value $T_1$, the torque protection device friction pair slips, and at the moment, the actual torque borne by the harmonic reducer is $i \cdot T_1$, the actual torque transmitted back to the ultrasonic motor driven friction pair is $T_1$, $T_1$ is equal to $T_2$ and smaller than $T_3$ and $i \cdot T_1$ is smaller than or equal to $T_4$, so that the friction contact surface between the stator of the ultrasonic motor body and the rotor of the ultrasonic motor body is not damaged, and the harmonic reducer is not damaged; and when $T_1$ is greater than $T_4/i$, namely $T_2$ is equal to $T_1$, in a case that the load applied to the output end of the motor is larger than or equal to $T_4$, after the torque transmitted back to the torque protection device friction pair reaches the static friction torque limit value $T_4/i$, the torque protection device friction pair slips, and at the moment, the actual torque borne by the harmonic reducer is $T_4$, the actual torque transmitted back to the ultrasonic motor driven friction pair is $T_4/i$, $T_4/i$ is equal to $T_2$ and smaller than $T_1$, and $T_1$ is smaller than $T_3$, so that the friction contact surface between the stator of the ultrasonic motor body and the rotor of the ultrasonic motor body is not damaged, and the harmonic reducer is not damaged.

19. The implementation mode of the high-torque and high-precision ultrasonic motor with a self-protection function according to claim 11, wherein a maximum torque output by the ultrasonic motor driven friction pair is denoted by $T_3$, a maximum working torque output by the ultrasonic motor driven friction pair is denoted by $T_1$, a static friction torque of the torque protection device friction pair is denoted by $T_2$, a maximum torque instantaneously allowed by the harmonic reducer is denoted by $T_4$, and a output reduction ratio of the harmonic reducer is denoted by i, $T_1$ is 70%-85% of $T_3$, namely $T_1$ is equal to $(70\%-85\%) \cdot T_3$, the static friction torque $T_2$ is smaller than or equal to the maximum working torque $T_1$, and, the static friction torque $T_2$ is smaller than or equal to $T_4/i$, and the upper limit value of the static friction torque $T_2$ is a smaller value of $T_1$ and $T_4/i$;

when $T_1$ is smaller than or equal to $T_4/i$, namely $T_2$ is equal to $T_1$, in a case that the load applied to the output end of the motor is larger than or equal to $i \cdot T_2$, after the torque transmitted back to the torque protection device friction pair reaches the static friction torque limit value $T_1$, the torque protection device friction pair slips, and at the moment, the actual torque borne by the harmonic reducer is $i \cdot T_1$, the actual torque transmitted back to the ultrasonic motor driven friction pair is $T_1$, $T_1$ is equal to $T_2$ and smaller than $T_3$ and $i \cdot T_1$ is smaller than or equal to $T_4$, so that the friction contact surface between the stator of the ultrasonic motor body and the rotor of the ultrasonic motor body is not damaged, and the harmonic reducer is not damaged; and when $T_1$ is greater than $T_4/i$, namely $T_2$ is equal to $T_1$, in a case that the load applied to the output end of the motor is larger than or equal to $T_4$, after the torque transmitted back to the torque protection device friction pair reaches the static friction torque limit value $T_4/i$, the torque protection device friction pair slips, and at the moment, the actual torque borne by the harmonic reducer is $T_4$, the actual torque transmitted back to the ultrasonic motor driven friction pair is $T_4/i$, $T_4/i$ is equal to $T_2$ and smaller than $T_1$, and $T_1$ is smaller than $T_3$, so that the friction contact surface between the stator of the ultrasonic motor body and the rotor of the ultrasonic motor body is not damaged, and the harmonic reducer is not damaged.

20. The implementation mode of the high-torque and high-precision ultrasonic motor with a self-protection function according to claim 12, wherein a maximum torque output by the ultrasonic motor driven friction pair is denoted by $T_3$, a maximum working torque output by the ultrasonic motor driven friction pair is denoted by $T_1$, a static friction torque of the torque protection device friction pair is denoted by $T_2$, a maximum torque instantaneously allowed by the harmonic reducer is denoted by $T_4$, and a output reduction ratio of the harmonic reducer is denoted by i, $T_1$ is 70%-85% of $T_3$, namely $T_1$ is equal to $(70\%-85\%) \cdot T_3$, the static friction torque $T_2$ is smaller than or equal to the maximum working torque $T_1$, and, the static friction torque $T_2$ is smaller than or equal to $T_4/i$, and the upper limit value of the static friction torque $T_2$ is a smaller value of $T_1$ and $T_4/i$;

when $T_1$ is smaller than or equal to $T_4/i$, namely $T_2$ is equal to $T_1$, in a case that the load applied to the output end of the motor is larger than or equal to $i \cdot T_2$, after the torque transmitted back to the torque protection device friction pair reaches the static friction torque limit value $T_1$, the torque protection device friction pair slips, and at the moment, the actual torque borne by the harmonic reducer is $i \cdot T_1$, the actual torque transmitted back to the ultrasonic motor driven friction pair is $T_1$, $T_1$ is equal to $T_2$ and smaller than $T_3$ and $i \cdot T_1$ is smaller than or equal to $T_4$, so that the friction contact surface between the stator of the ultrasonic motor body and the rotor of the ultrasonic motor body is not damaged, and the harmonic reducer is not damaged; and when $T_1$ is greater than $T_4/i$, namely $T_2$ is equal to $T_1$, in a case that the load applied to the output end of the motor is larger than or equal to $T_4$, after the torque transmitted back to the torque protection device friction pair reaches the static friction torque limit value $T_4/i$, the torque protection device friction pair slips, and at the moment, the actual torque borne by the harmonic reducer is $T_4$, the actual torque transmitted back to the ultrasonic motor driven friction pair is $T_4/i$, $T_4/i$ is equal to $T_2$ and smaller than $T_1$, and $T_1$ is smaller than $T_3$, so that the friction contact surface between the stator of the ultrasonic motor body and the rotor of the ultrasonic motor body is not damaged, and the harmonic reducer is not damaged.

\* \* \* \* \*